H. E. KEYES.
PIPE COUPLING.
APPLICATION FILED MAR. 12, 1906.
920,963.
Patented May 11, 1909.
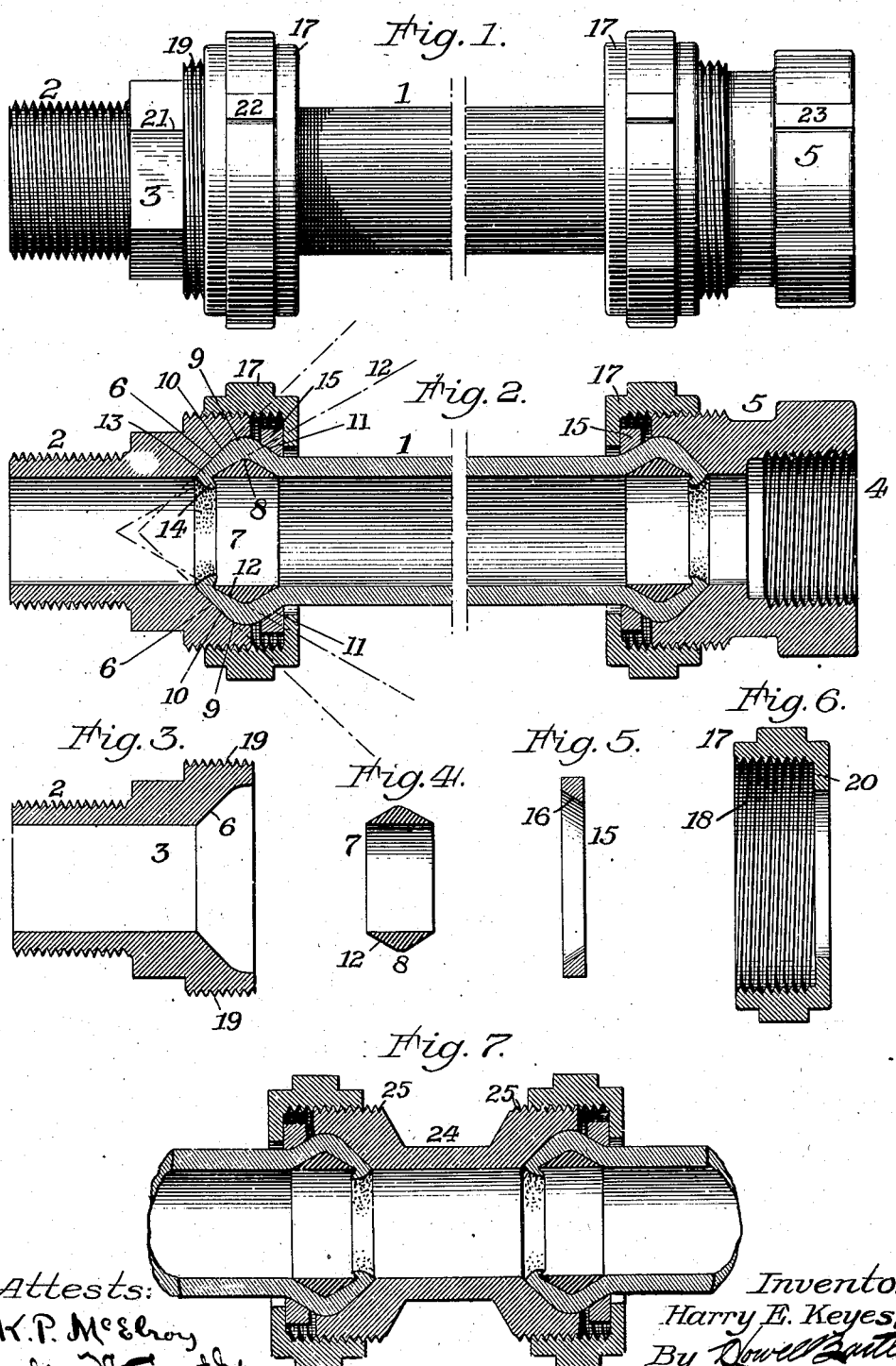
Attests:
K. P. McElroy
Parker H. Sweet Jr.
Inventor:
Harry E. Keyes,
By Lowell Battle
Attorney.

UNITED STATES PATENT OFFICE.

HARRY E. KEYES, OF HOMESTEAD, PENNSYLVANIA, ASSIGNOR TO JOSEPH A. DOYLE, OF HOMESTEAD, PENNSYLVANIA.

PIPE-COUPLING.

No. 920,963.  Specification of Letters Patent.  Patented May 11, 1909.

Application filed March 12, 1906. Serial No. 305,559.

*To all whom it may concern:*

Be it known that I, HARRY E. KEYES, a citizen of the United States, residing at Homestead, in the county of Allegheny and State of Pennsylvania, have invented new and useful Improvements in Pipe-Couplings, of which the following is a specification.

My invention relates to pipe-couplings and more particularly to couplings adapted for pipes for high-pressure fluids such as compressed air. In devices of this kind heretofore employed one of the chief objections has been the liability of the coupling to be disconnected and the hose or pipe blown out by a sudden flow of excessive pressure.

One object of my invention is to provide hose-gripping members of a particular form that will obviate this objection and provide a secure connection.

Other objects are to provide means of ready attachment of the coupling to any other screw connection and to generally improve and simplify a device of this character.

To these ends my invention is embodied in preferable form in the coupling hereinafter described and illustrated in the accompanying drawings.

In these drawings, Figure 1, is an exterior elevation showing a broken section of hose between two couplings each embodying my invention, and one of said couplings having a male attachment and the other a female attachment; Fig. 2, is a longitudinal section of the parts of Fig. 1; Figs. 3, 4, 5 and 6 are detail views in longitudinal section of the coupling members; and Fig. 7, is a detail longitudinal section of a double cone-bearing sleeve.

Referring to the drawings, 1 designates a section of a flexible hose, shown as having its opposite ends each secured to one of the improved couplings. In Figs. 1 and 2 the coupling shown on the left is provided with a male screw connection 2, on an outer cone-bearing sleeve member 3, while in the coupling at the right of the figures a female screw 4, on a similar outer sleeve member 5, is provided. These screw connections 2 and 4 may interfit to connect two couplings or they may be employed to join the ends of the hose-pipe to other metallic connections.

The construction of the hose-engaging members of the coupling is the same in both forms. Referring to the coupling having the male connection and illustrated in Figs. 1, 2, 3, 4, 5 and 6, the sleeve member 3 is provided with an interior cone-shaped bearing face 6 at its inner end against which is adapted to be forced and clamped the end of the flexible hose section, 1.

Adapted to be placed within the end of the hose-pipe, preferably by forcing it into said hose is a hard metal ring 7, having an annular conical ridge 8, the diameter of which is greater than the normal diameter of the hose section, whereby when the ring is inserted, the hose will be distended near its outer end so as to form a conical annular shoulder 9, against the faces 10, 11 of which are clamped the cone bearing clamp members of the coupling.

As will appear from the dotted line in Fig. 2, the face 12 of the ring 7 is slanted from the face 6 of the cone-sleeve 3, so that these faces converge at an acute angle in the direction of the end of the hose-pipe. By this angular inclination of the clamping members the compressive gripping action thereof is centered at the point 13, where the corner of the ring 7 presses the hose against the cone-sleeve 3. As a result the corner of the ring will be indented into the hose, effecting a projection of the same beyond the ring into a holding lip 14, and a biting action will be obtained by the angular clamping contact that will securely hold the hose section against slipping from the coupling under undue pressure.

To effect the clamping pressure on the sleeve and ring, an annular ring 15 having a cone face 16 is placed around the hose behind the face 11 of the shoulder 9. Against this exterior ring is adapted to be clamped an adjustable locking and compression member 17 consisting of a sleeve having interior screw-threads 18 which engage threads 19 on the sleeve member 3. The locking sleeve 17 has an annular shoulder 20 bearing against the ring 15, whereby upon screwing up the sleeve 17 on the sleeve 3, the ring will be forced against the shoulder of the hose and the latter will be compressed and clamped between the sleeve 3 and interior cone ring 7. The sleeves 3 and 17 are provided with suitable projections 21, 22 respectively, whereby they may be turned by hand or by a wrench to adjust or unlock the coupling. Similarly the sleeve 5 of the right hand coupling may be provided with projections 23, for the same purpose.

In Fig. 7, there is shown a double-cone bearing sleeve member 24 having similar ends and provided with threaded shoulders 25 adapted to be engaged by adjustable locking members, and having interior cone surfaces 24 to receive the ends of two hose sections. This sleeve member is adapted to connect two sections of hose and is more particularly designed to be used to repair a break in the pipe.

It is clear that changes in the various features of the device herein shown and described may be made without departing from the principle of my invention.

Having thus described my invention what I claim is:

In a hose coupling, the combination with a flexible hose, of a bearing ring within the hose, said ring having an exterior conical bearing surface terminating at the edge of the ring in a substantially sharp biting edge, the free end of said hose extending beyond said biting edge, a cone bearing sleeve exterior to the hose, said sleeve having its conical bearing surface at a slightly greater angle than the angle of the bearing surface on said ring and being adapted by pressure to clamp the hose against the biting edge of said ring, and means for clamping said ring and sleeve together.

In testimony whereof I have hereunto set my hand in presence of two subscribing witnesses.

HARRY E. KEYES.

Witnesses:
A. J. HUNTER,
WILLIAM BARNES.